United States Patent [19]

Porta et al.

[11] Patent Number: 5,362,688
[45] Date of Patent: Nov. 8, 1994

[54] PREPARATION OF GRANULATED ALKALINE EARTH METAL CARBONATE

[75] Inventors: Jacopo Porta; Guido Riccioli; Pierino Trifoni; Christian Schiffling, all of Massa, Italy

[73] Assignee: Solvay Barium Strontium GmbH, Hannover, Germany

[21] Appl. No.: 29,650

[22] Filed: Mar. 11, 1993

[30] Foreign Application Priority Data

Mar. 13, 1992 [DE] Germany .................... 4208068

[51] Int. Cl.⁵ .................................. C01F 11/18
[52] U.S. Cl. .................... 501/27; 23/313 R; 23/313 P; 423/430; 106/403; 106/464; 106/465
[58] Field of Search .................. 23/313 R, 313 P; 501/27; 423/430; 106/463, 464, 465

[56] References Cited

U.S. PATENT DOCUMENTS 3,615,811 10/1971 Barrett .................... 423/430
4,015,973 4/1977 Perrine .................... 423/430
4,888,161 12/1989 Adams, Jr. et al. ............ 423/430
4,954,134 9/1990 Harrison ................... 23/313 R

*Primary Examiner*—Mark L. Bell
*Assistant Examiner*—C. M. Bonner
*Attorney, Agent, or Firm*—Evenson, McKeown, Edwards & Lenahan

[57] ABSTRACT

A method for preparing granulated alkaline earth metal carbonate, especially barium carbonate and strontium carbonate, by adding a binding agent and optionally water, and granulating the carbonate material by the action of mechanical forces or by accretional granulation in, for example, a flash reactor, with simultaneous drying, and thereafter optionally subjecting the granules to a high-temperature treatment, in which method the material to be granulated and the granulated material do not come in contact with inorganic refractory material either during the granulation or during any subsequent high-temperature treatment.

9 Claims, No Drawings

PREPARATION OF GRANULATED ALKALINE EARTH METAL CARBONATE

BACKGROUND OF THE INVENTION

The invention relates to a method for preparing granulated alkaline earth metal carbonate, to granulated alkaline earth metal carbonate obtainable thereby, and to its use in the glass industry.

Alkaline earth metal carbonate, especially barium carbonate and strontium carbonate, are used in the glass industry, for example in the manufacture of frontplates for television receivers. In this manner X-rays from cathode tubes can be absorbed.

One method for the production of very pure alkaline earth metal carbonates is the precipitation of alkaline earth metal hydroxides or alkaline earth metal sulfides with carbon dioxide or carbonates. In this process very fine powders are formed, which are hard to handle. The granulation of these powders has heretofore been performed by sintering at about 800° C. in rotary kilns which are lined with inorganic refractory materials, e.g., with amorphous silicon dioxide, aluminosilicates or fire clay. In such kiln granulation processes it is absolutely impossible to prevent detritus of refractory material from contaminating the granules. As a result of these impurities, a considerable proportion of the frontplates produced must be considered unusable and must be remelted.

Adams et al., U.S. Pat. No. 4,888,161 describes a method in which the contamination of the carbonate by detritus of refractory material, which is to be attributed to the high sintering temperature of 800° C., can be reduced. In this process, a suspension of the carbonate in water is first prepared, and an amount of a deflocculant sufficient to deflocculate the carbonate is added, preferably alkali metal salts or ammonium salts of acrylic acid or methacrylic acid or of phosphoric acid or polyphosphoric acid. The liquefied suspension is then dried in a spray dryer, and the resulting granular product is heated to 600° to 700° C. The type of heating used is described as not critical.

There remains a need for an improved method of producing granulated, high purity alkaline earth metal carbonate.

SUMMARY OF THE INVENTION

It is the object of the present invention to provide a method of producing granulated alkaline earth metal carbonate material which is absolutely free of inorganic refractory materials.

Another object of the invention is to provide a method of producing granulated alkaline earth metal carbonate material free of inorganic refractory contaminants in a technically simple manner.

These and other objects of the invention are achieved by providing a method for preparing granulated calcium carbonate, barium carbonate or strontium carbonate comprising simultaneously heating and shaping a carbonate material to be granulated into granules, wherein the granulation is performed in the presence of a binding agent additive, and the shaping is performed either by the action of mechanical forces or as granulation by accretion, and wherein the carbonate material to be granulated and the resulting granulated carbonate material are maintained free of contact with inorganic refractory material.

DETAILED DESCRIPTION OF PREFERRED EMBODIMENTS

The method of the invention for the preparation of granulated calcium carbonate, barium carbonate or strontium carbonate in which the material to be granulated is simultaneously heated and shaped into granules with the addition of additives and then, if desired, subjected to a high-temperature treatment, is characterized by the fact that the granulation is performed in the presence of a binding agent as additive and the shaping is performed either by the action of mechanical forces or as granulation by accretion, while the material does not come in contact with inorganic refractory material either in the shaping or during any subsequent high-temperature treatment.

The amount of binding agent can vary widely. Preferably the binding agent is contained in an amount of 0.05 to 5 wt. % of the dry mass in the granulated product.

In accordance with one particularly simple embodiment, the material product to be granulated is treated in anhydrous form with an appropriate binding agent and then simply granulated. Suitable binding agents are those which have adhesive properties even without the presence of water. Drying is not performed in this case. If desired, the granules can be subjected to a high-temperature treatment. As used herein, the term "high-temperature treatment" refers to heating to a temperature above 300° C. up to the sintering temperature of the granules, particularly 500° C. to 700° C., especially 500° C. to 600° C.

According to one preferred embodiment of the invention, the granulation is performed in the presence of water, and the granulated material is dried after the granulation. In this case it is likewise possible to follow the drying with a high-temperature treatment.

The granulation can be performed with equipment that is conventionally used for granulation by accretion. Apparatus which granulate mechanically are also known in the art. It is thus possible to operate in the manner of a roller granulation, combination granulation or compacting granulation. Heated granulating drums, granulating plates, plate mixers, spraying drum mixers, trough-and-screw mixers or roller presses, for example, are all highly suitable.

Flash reactors are especially well suited. In such reactors the material to be granulated is subjected to a centrifugal acceleration in the space between two heated, concentric cylinders which rotate at different speeds. The inner cylinder advantageously has adjustable scrapers which facilitate removal of the product. The heating is performed, for example, by steam, hot air or a heat transfer medium. Conventional flash reactors are made of metal (e.g., carbon steel, stainless steel, monel or other alloys) and do not have any ceramic components made of inorganic refractory materials. By varying the relative rotational speeds of the two cylinders and by varying the angle of the scrapers, the granulometry and bulk weight of the desired granulated product can be influenced. It is also possible to affect the granulometry and the specific weight of the granular product by varying the heating temperature in the cylinders. In commercial flash reactors the temperatures can be regulated, for example, within 100° to 400° C. In flash reactors dry material can be used in accordance with the embodiment described above. Of course, material containing moisture can also be used, as it will be explained further on.

If a drying and/or high-temperature treatment is performed, conventional apparatus can be used, except for those which are lined with inorganic refractory materials. Drum dryers or fluidized-bed dryers are highly suitable, for example.

According to one preferred variant of the method of the invention, the granulation is performed in the presence both of water and of a binding agent, and then the granular product is dried, but no high-temperature treatment is performed. The water that is present can be introduced into the material to be granulated either by using carbonate material which contains water and/or by using a binding agent which contains water, preferably in the form of a binding agent solution. Of course, it is possible to start out with dry materials and add the desired amount of water, for example by spraying, especially in the form of an aqueous solution of the binding agent. The moisture content can also be adjusted by mixing together moisture-containing filter cake from the carbonate precipitation and dry carbonate in powder or granulated form.

The amount of water can vary depending on the granulating equipment used. If, for example, a flash reactor is used, the moisture content can be quite high, and may amount, for example, to as much as 60% or more, by weight, in the mixture. Here, for example, the still-moist filter cake can be used, which is obtained in the carbonate precipitation followed by pressing out the water.

Suitable binding agents are especially water-soluble organic polymeric or oligomeric compounds. Highly suitable binding agents include, for example, natural water-soluble polymers, as for example oligomeric or polymeric saccharides such as starch, boiled native potato starch, dextrin (e.g., Avedex 58-MD-14 from AVEBE), cold-soluble potato starch (e.g., Paselli WA-4), cold-soluble wheat starch (e.g., Cremocine B). Also suitable are modified natural polymers such as carboxymethylcellulose, e.g., Tylose H20, Tylose C30 or Tylose MH50 from Hoechst. Synthetic polymers such as polyvinyl alcohol, e.g., Mowiol 4-88, or sodium polyacrylate, e.g., Sokalan PA20, are also usable, the same as silicic acid ester or water glass.

The binding agent can, as stated, be present in the product to be granulated, in an amount of 0.05 to 5 weight-percent of the dry mass. Preferably the binding agent is contained in the mixture to be granulated in the amount of 1 to 5%, especially 1.5 to 3%, by weight, if no high-temperature treatment is to be carried out.

According to another preferred variant of the present invention, the granulation is performed in the presence of water and binding agent, and the material is additionally subjected to a high-temperature treatment. The amount of binding agent can be 0.05 to 3% by weight of the dry mass. Preferably, the amount of binding agent is in the low range, for example in the range of 0.05 to 0.9% by weight, of the dry mass. Particularly good results have been obtained with binding agent contents in the range of 0.3 to 0.8% by weight of the dry mass.

Many water-soluble inorganic or organic compounds can be used as binding agents. Highly suitable binding agents include, for example, alkali hydroxides (or their lyes), water-soluble silicates, especially water glass, silicic acid esters, natural or synthetic organic oligomers or polymers such as dextrin, sodium polyacrylate, e.g., the commercial products Sokalan PA20, PA25 or PA30, or polyvinyl alcohol, e.g., Moviol 4-88 from Hoechst. Combinations of alkali metal hydroxides (or their lyes) and sodium polyacrylate are especially suitable. In that case, preferably 0.1 to 0.3 wt.-% of $Na_2O$ in the form of NaOH and 0.4 to 0.6 wt.-% of sodium polyacrylate are contained in the material to be granulated, each with respect to the dry mass.

The invention also relates to granulated calcium carbonate, barium carbonate or strontium carbonate produced according to the method of the invention by granulation and an optional heat treatment which is free of inorganic refractory materials and has a binding agent content of 0.05% to 5% by weight. Preferred binding agents include alkali lyes, water glass, silicic acid esters, starch, native potato starch, dextrin, cold-soluble potato starch, cold-soluble wheat starch, polyvinyl alcohol, sodium polyacrylate, or combinations thereof, and especially water glass, polyvinyl alcohol and combinations of alkali metal hydroxide and sodium polyacrylate. The particle size is preferably less than 1 millimeter. The granules obtainable with a flash reactor can have a specific weight, for example, of from 1.2 to 2.0 $kg/dm^3$.

The method of the invention enables preparation of granular alkaline earth metal carbonates, especially barium carbonate and strontium carbonate, in a technically simple manner. A product is obtained with a narrow range of particle size, and the average particle diameter can be adjusted and controlled in a simple manner. The free flow of the granules according to the invention that have sufficient hardness is very good.

The method of the invention using a flash reactor is especially advantageous. Using such a reactor, the spectrum of the granule diameter and the density can be controlled by varying the relative speed of the rotation of the installations, the possible temperature variation of the heating medium in the installations, and by varying the angle of the internal scrapers. In the method of the invention the range of the average particle diameter and density can also be varied by varying the binding agent and its concentration.

The granular products according to the invention can be used for purposes for which alkaline earth metal carbonates are conventionally used. Due to their advantageous properties, especially the fact that they are free of inorganic refractory materials, they are especially suitable for use in the glass industry, particularly in the production of frontplates for picture tubes.

The invention will be explained in further detail by the following examples, which are intended to illustrate the invention and are not limiting on its scope.

EXAMPLE 1

Preparation of granules of barium carbonate with an organic binding agent.

The granulation was performed in a heated flash reactor with two rotating cylinders. The temperature of the heating fluid was adjusted to 194° C., the speed of rotation of the outer wall of the inner cylinder was 30 meters per second, and the temperature of the granulated product discharged from the flash reactor was 30° C.

In the flash reactor, polyvinyl alcohol was added as a binding agent to finely divided barium carbonate powder in such an amount that the polyvinyl alcohol content amounted to 2% of the total weight of the material to be granulated. The finished granulated product had a specific weight of 1.45 kilograms per cubic decimeter.

Granulometry (Particle Diameter Spectrum):
>0.85 mm=8.0%
>0.6 mm=22.5%
>0.25 mm=48.0%
>0.15 mm=10.5%
<0.15 mm=11.0%

EXAMPLE 2

Preparation of strontium carbonate granules with inorganic binding agent.

An aqueous strontium carbonate preparation having a moisture content of 30 wt.-% was used. Water glass (sodium silicate) was added to the flash reactor as binding agent in such an amount that the water glass content amounted to 2% of the weight of the dry mass of the total mixture. The temperature of the heating fluid was maintained at 225° C.; the peripheral velocity was 35 m/sec, and the exit temperature of the finished granules was 40° C. The specific weight of the product was 1.4 kg/dm$^3$.

Granulometry:
>0.85 mm=4.3%
>0.06 mm=26.5%
>0.25 mm=50.2%
>0.15 mm=15.0%
<0.15 mm=4.0%

EXAMPLE 3

Preparation of barium carbonate granules with inorganic binder.

An aqueous barium carbonate preparation having a moisture content of 40 wt.-% was used. Water glass was added in the flash reactor in such an amount that sodium silicate was contained in the total mixture in the amount of 1.2 wt.-% with respect to the dry mass. The heating fluid was maintained at a temperature of 205° C.; the peripheral velocity was 38 meters/sec, and the exit temperature of the issuing product was 35° C. The specific weight of the product was 1.5 kg/cm$^3$.

Granulometry:
>0.85 mm=1.0%
>0.6 mm=20.5%
>0.25 mm=40.3%
>0.15 mm=28.2%
<0.15 mm=21.0%

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claim is:

1. A method for preparing a granulated carbonate comprising simultaneously heating and shaping a carbonate material to be granulated into granules, wherein said carbonate is calcium carbonate, barium carbonate or strontium carbonate, and the granulation is performed in a flash reactor and in the presence of a binding agent additive, and the shaping is performed either by the action of mechanical forces or as granulation by accretion, and wherein the carbonate material to be granulated and the resulting granulated carbonate material are maintained free of contact with inorganic refractory material.

2. A method according to claim 1, further comprising the step of subjecting the resulting granulated carbonate material to a high-temperature treatment, wherein the resulting granulated carbonate material is maintained free of contact with inorganic refractory material during said high-temperature treatment.

3. A method according to claim 1, wherein the binding agent is contained in the granulated product in an amount of 0.05 to 5 wt.-% with respect to the dry mass.

4. A method according to claim 1, wherein said granulating step is carried out in the presence of water.

5. A method according to claim 2, wherein said high-temperature treatment is carried out in a drum dryer or a fluidized-bed dryer.

6. A method according to claim 1, wherein said high-temperature treatment is performed at a temperature of from 500° C. to 700° C.

7. A method according to claim 1, wherein said carbonate material is selected from the group consisting of barium carbonate and strontium carbonate.

8. A method according to claim 1, wherein said binding agent is selected from the group consisting of alkali hydroxide, water glass, silicic acid ester, starch, dextrin, polyvinyl alcohol, sodium polyacrylate, and mixtures thereof.

9. A method according to claim 8, wherein said starch is selected from the group consisting of native potato starch, cold-soluble potato starch, and cold-soluble wheat starch.

* * * * *